United States Patent [19]
Smith

[11] Patent Number: 5,205,909
[45] Date of Patent: Apr. 27, 1993

[54] APPARATUS FOR MEASURING REFLUX FLOW IN A DISTILLATION COLUMN

[75] Inventor: Gerald L. Smith, Galveston, Tex.

[73] Assignee: Union Carbide Chemicals & Plastics Technology Corporation, Danbury, Conn.

[21] Appl. No.: 802,203

[22] Filed: Dec. 4, 1991

[51] Int. Cl.⁵ .................. B01D 3/42; B01D 5/00
[52] U.S. Cl. ................ 202/160; 202/185.1; 202/187; 202/190; 202/206; 203/1; 203/98
[58] Field of Search .............. 202/206, 106, 185.1, 202/185.3, 185.4, 185.5, 185.6, 187, 189-196, 161, 181; 203/1, 98; 196/132, 139, 138

[56] References Cited

U.S. PATENT DOCUMENTS

| | | |
|---|---|---|
| 1,049,718 | 1/1913 | Howard . |
| 1,730,892 | 10/1929 | Leslie .................. 203/1 |
| 2,398,807 | 4/1946 | Scovill et al. ............ 202/161 |
| 2,445,854 | 7/1948 | Keyworth ............... 73/216 |
| 2,473,765 | 6/1949 | Platts .................. 73/215 |
| 2,518,574 | 8/1950 | Skopecek ............... 261/110 |
| 2,625,041 | 1/1953 | Hein ................... 73/202 |
| 2,648,981 | 8/1953 | Drake, Jr. ............... 73/215 |
| 2,767,581 | 10/1956 | Moorehead .............. 73/215 |
| 2,815,317 | 12/1957 | Irvine .................. 202/40 |
| 3,032,479 | 5/1962 | Norman ................ 202/206 |
| 3,053,521 | 9/1962 | Plaster et al. ............ 261/114 |
| 3,322,136 | 5/1967 | Matta .................. 137/118 |
| 3,332,856 | 7/1967 | Hart ................... 202/206 |
| 3,340,157 | 9/1967 | Weiss .................. 202/180 |
| 3,607,665 | 9/1971 | Rogers ................. 203/1 |
| 3,825,491 | 7/1974 | Sanchez ................ 202/206 |
| 3,881,994 | 5/1975 | Fickel .................. 202/160 |
| 4,046,638 | 9/1977 | Fickel .................. 203/1 |
| 4,089,749 | 5/1978 | Karamian .............. 202/185.6 |
| 4,230,533 | 10/1980 | Giroux ................. 203/1 |
| 4,354,852 | 10/1982 | Kydd .................. 55/18 |

FOREIGN PATENT DOCUMENTS 563987   7/1977   U.S.S.R. .................. 202/206

Primary Examiner—Wilbur Bascomb, Jr.
Attorney, Agent, or Firm—E. C. Trautlein

[57] ABSTRACT

A method and apparatus are disclosed wherein a standpipe mounted in an accumulator outside the operating zone of a distillation column is used in conjunction with a liquid level controller to measure condensate collected in the accumulator and to change the amount of energy provided to the distillation column in response to changes in the level of condensate collected in the accumulator.

6 Claims, 2 Drawing Sheets 5,205,909

APPARATUS FOR MEASURING REFLUX FLOW IN A DISTILLATION COLUMN

FIELD OF THE INVENTION

This invention relates to method and apparatus for measuring reflux flow and controlling the operation of a distillation column.

BACKGROUND OF THE INVENTION

In many chemical processes it is desirable to condense vapor flow from a distillation column and reflux the condensate to the column in order to accomplish the desired separation. One such chemical process is for the manufacture of oxoalcohols. In some cases this is accomplished by installing a condenser on top of the distillation column. The condensate from the condenser then can flow by gravity back to the top trays of the column. The advantage of this arrangement is reduced capital cost and operating cost because of the elimination of the need for reflux pumps, and consequently eliminating the power required to operate the pump(s) over the life of the system.

Without a pump the condensate flow cannot be effectively measured because there is insufficient pressure drop available in the gravity flow line from the liquid accumulator section of the condenser back to the column to meet the minimum requirements of a differential pressure cell type measurement device. Accordingly up until now, when choosing to mount a condenser on top of the column it was then predetermined to operate the column without effective and useful measurement of the condensed liquid flow (reflux) from the condenser. The column operation, therefore, cannot be fully optimized for energy usage and product quality.

Prior to the invention operators had to manage the column in a manual mode both during steady state operation and during upsets. The steam usage was higher than needed to achieve the desired separation since there was no way to optimize it. This excessive steam overloaded the condenser when the column feed rate stopped or significantly decreased.

The prior art discloses methods and apparatus for controlling fractional distillation apparatus. Scovill U.S. Pat. No. 2,398,807, issued Apr. 23, 1946, is typical of the prior art. In Scovill, there is shown a fractionating column having a distilling chamber and a condensing chamber above the distilling chamber. A collector is arranged to catch liquid from the condenser and direct it into a calibrated chamber. The chamber is provided with a valve for opening and closing flow from the chamber. When it is desired to measure rate of flow of the reflux the chamber is closed and reflux is collected. The filling of the chamber may be timed by viewing through a sight glass and the rate of flow thus ascertained. This results in unsteady operation of the rectifying section of the distillation column.

In Fickel U.S. Pat. No. 3,881,994, issued May 6, 1975, there is described a control system for regulating heat input to the reboiler section of a distillation column. Flow-measuring means for determining the quantity of vapor passing into the fractionation section is internally disposed within the reboiler section and provides a signal which is transmitted to the reboiler heater thereby regulating the degree of vaporization to be effected therein.

Howard U.S. Pat. No. 1,049,718, issued Jan. 7, 1913, shows a standpipe with lateral discharge orifices which serve as a means for indicating flow of liquid therethrough by noting the number of discharge orifices through which liquid flows.

Plaster U.S. Pat. No. 3,053,521, issued Sep. 11, 1962 shows a method to control the product removal from a side draw tray by using a weir assembly within the distillation zone of the column.

Nothwithstanding the teaching of the above prior art, there exists a long felt need for a method and apparatus for measuring the amount of condensate in a gravity flow reflux to optimize operation of a distillation column, by regulating the heat input to the column to give only the desired degree of separation.

SUMMARY OF THE INVENTION

The above need has been met by the method and apparatus of the present invention. Method and apparatus have been discovered whereby reflux liquid is accumulated in an accumulator outside the operating portion of the distillation column and, therefore, is capable of being measured by a measuring device which in the preferred embodiment is a pressure differential measuring cell. The present invention may be used in any distillation process wherein gravity is used to cause reflux condensate to flow from the condenser to a distillation column.

In one aspect of the invention, there is provided a method for controlling the operation of a distillation column wherein reflux condensate is provided to said column by gravity flow which comprises:

introducing a feed stream to a distillation column;

providing energy to said column to vaporize said feed stream in addition to a portion of the reflux condensate;

passing a vapor stream from said distillation column to a condensing zone;

condensing at least a portion of said vapor stream in said condensing zone to form condensate;

collecting the condensate in an accumulator;

passing and controlling either directly or indirectly the flow rate of condensate from the accumulator back to the distillation column;

measuring the liquid level of condensate in the accumulator;

generating a signal in response to the measured condensate level; and operating a controlled device in response to said signal to change the energy level provided to said distillation column thereby changing the amount of vapor passing through said column and thereby achieving the desired separation of the feed stream.

In another aspect of the invention there is provided apparatus for controlling the operation of a distillation column by regulating the heat input thereto which comprises:

a distillation column;

a condenser mounted on top of and in flow communication with said distillation column;

an accumulator associated with said condenser for collecting condensate from said condenser;

a reflux line from said accumulator to the top stage of said distillation column;

a standpipe mounted in said accumulator on the outlet from the accumulator to the reflux line, said standpipe having a pattern of openings around the surface thereof for permitting accumulated condensate to flow into the reflux line;

a liquid level measuring device connected to said accumulator to measure the level of accumulated condensate in said accumulator and to generate a signal; and a control device in a heat input line to said distillation column operated in response to the generated signal to change the flow of heat to the distillation column.

DETAILED DESCRIPTION OF THE INVENTION AND PREFERRED EMBODIMENT THEREOF

Figure 1:
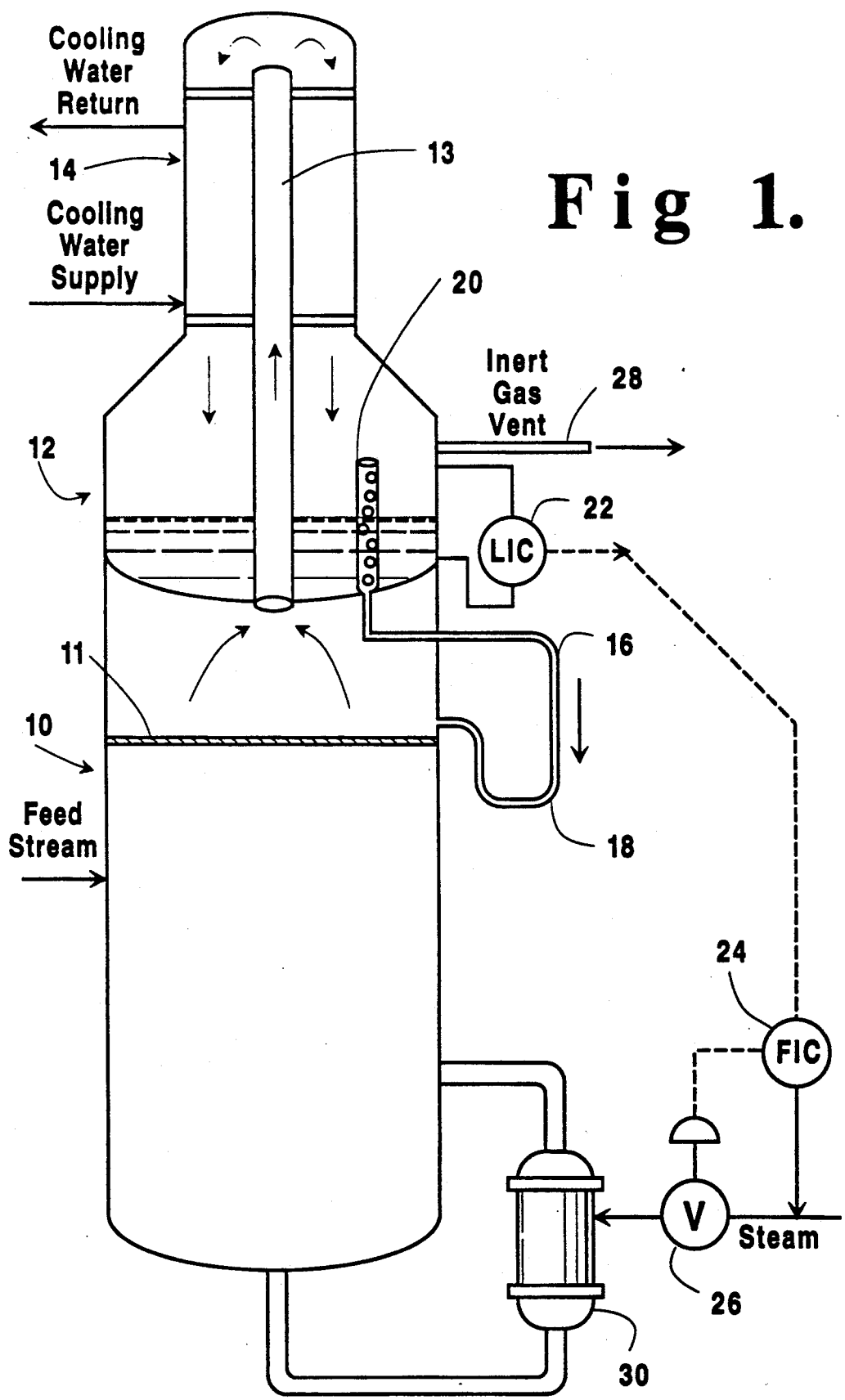
FIG. 1 is the schematic representation of the apparatus of and for carrying out the invention and particularly illustrates the embodiment wherein the openings around standpipe 20 are a spiral pattern of holes.
Figure 1A:
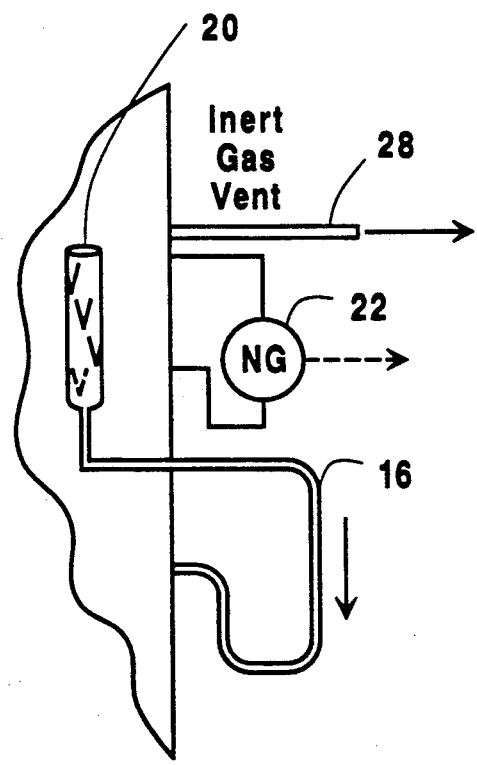
FIG. 1a is the schematic representation of a portion of the apparatus of and for carrying out the invention wherein the openings around the standpipe 20 are vee slots arranged in a spiral pattern and wherein liquid level measuring device 22 is a nuclear gauge type.

Referring to the drawing, the invention will be described with respect to a preferred embodiment of the invention. Modification of such embodiment may occur to one skilled in the art without departing from the spirit and scope of the invention.

In the drawing, the apparatus comprises a distillation column 10. Mounted above the column 10 and in flow relationship therewith is an accumulator 12 and a condenser 14. The accumulator 12 is connected to column 10 by reflux line 16. Reflux line 16, preferably has a loop sealing segment 18. A standpipe 20, preferably of the same diameter or larger then the diameter of reflux line 16, is mounted in accumulator 12 on the liquid condensate outlet from the accumulator 12. Preferably, standpipe 20 has a spiral pattern of holes around the circumference of the standpipe. It is understood that vee slots may be used instead of holes. In the preferred embodiment a liquid level indicator/controller 22 is connected to accumulator 12.

The liquid level indicator 22 in the preferred embodiment comprises a differential pressure transmitter, a receiving device or controller and a controlled device such as a motor valve. The differential pressure transmitter is a device that measures the level of condensate in the accumulator 12 by pressure difference. There are two connections from the accumulator to the differential pressure transmitter. One connection is made to the lower part of the accumulator near the elevation of the bottom holes of the standpipe 20 and is the high pressure connection. The other connection is made in the upper part of the accumulator at about the same elevation as the top holes of the standpipe and is the low pressure connection.

When there is no level of liquid in the accumulator, both the high and low pressure leads will sense the same pressure (which will be the pressure of the condenser). For example, each lead will see 5 pounds per square inch if the condenser pressure is 5 psig.

If the level in the condenser is 50 percent filled with water, for example, and the range of the differential pressure transmitter is zero to 20 inches of water, the low pressure lead would still see 5 psig, but the high pressure lead would see 5 psig plus 10 inches of water head (which is equal to 0.37 psig). Accordingly, the transmitter would sense a 50 percent level and send a signal to the controller that equals one-half of its output range.

The receiving device (controller) 24 is normally located in the control room. It receives the signal from the transmitter. The controller has an adjustable set point. The operator sets the set point desired. The controller has an output part to it which changes when the signal indicates a difference from the set point. This output signal goes to a controlled device such as a motor controlled valve 26 on a steam line.

The liquid level indicator 22 described above, is the most widely used and accepted way to measure and control liquid levels in vessels. Other liquid level measuring devices which may be used in this invention is a nuclear gauge or a float-type device. Used in conjunction with the standpipe 20 the liquid level indicator provides a way to obtain a measurement of the reflux flow to the column which heretofore was not possible.

Overall length of the standpipe 20 is the extent that it must be long enough to make it possible to measure the level with a differential pressure transmitter. A differential pressure transmitter requires 20 inches of water for good accuracy, but for existing installations where the accumulator section depth is not adequate to meet this requirement, a 10 inch minimum overall height is acceptable. If the specific gravity of the liquid in the accumulator is less than water (specific gravity of water is 1.0), the standpipe should be longer than 20 inches overall length and if the specific gravity is greater than water, the overall length could be less than 20 inches and still be accurate.

The diameter of the standpipe should be equal to or larger than the reflux line and the reflux line should be sized to be self-venting.

The number and diameter of the holes in the standpipe is calculated to the expected range of liquid produced by the condenser as dictated by the column separation requirements. For example, if one hole that is ¼" in diameter will pass 100 pounds per hour of water through it when covered with water and the expected maximum reflux rate needed by the column is 8,000 pounds per hour, eighty ¼" holes would be required. When operating with all holes covered with liquid, the differential pressure transmitter would show a 20 inch differential which would send a 100 percent signal to the level indicator control. Because of head pressure differences created by the standing level of liquid, the holes on the lower part of the standpipe would pass more liquid than the ones on the top. From this it can be seen that for some cases in order to have a linear calibration of flow versus liquid level, it may be advantageous to make the lower holes smaller than the upper holes.

The pattern of the holes is critical in that they should spiral around the pipe so that they can be drilled and positioned to prevent dead zones between the holes. When the accumulator level changes, the number of holes and/or amount of a particular hole that is covered with liquid should also be changed. For example, if there is a 1 inch dead space between holes at any location on the pipe and the total differential pressure transmitter range is 20 inches of water, the level could change within that dead zone by 5 percent without really changing the amount of liquid flow.

A loop seal 18 is always needed on the reflux line 16 from condenser 14 that is mounted atop of a distillation column 10. The loop seal provides a low spot in the reflux line 16 where liquid from the condenser (reflux) can accumulate and thereby prevent column vapors from flowing backwards through the reflux line into the accumulator section 12 of the condenser. Without this liquid seal, column vapors could flow through the reflux line and bypass the condenser.

In operation, the vapor from the top tray 11 of distillation column 10 flows into and through a tube 13 to the top head of condenser 14 where the vapor flow direction reverses and enters the top of the bundle of condenser tubes not shown.

The vapors travel down the tube bundle until condensation takes place from a vapor to a liquid state. The tubes are surrounded by cooling water which is contained in the shell of condenser 14. The non-condensable vapor (inerts-such as nitrogen, air, etc.) is cooled but does not condense to the liquid state. It flows out of the system by way of inert vent line 28 as a vent. The condensed liquid falls from the tubes and accumulates in the accumulator 12 and in reflux line 16 and loop seal 18. Loop seal 18 acts as a liquid block to prevent column vapors from backflowing into condenser accumulator 12. The liquid level in accumulator 12 is measured by liquid level indicator 22 and is controlled by regulating the energy input to the column, e.g., steam to reboiler 30 which in turn varies the amount of vapor generation from the distillation column 10.

Having described the invention with respect to certain preferred embodiments it is obvious that modification to the apparatus and the arrangement thereof may occur to one skilled in the art without departing from the spirit and scope of this invention.

We claim:

1. Apparatus for controlling the operation of a distillation column which comprises:
   a distillation column;
   a condenser mounted on top of and in flow communcation with said distillation column;
   an accumulator associated with said condenser for collecting condensate from said condenser;
   a reflux line from said accumulator to the top stage of said distillation column;
   a standpipe mounted in said accumulator on the outlet from the accumulator to the reflux line, said standpipe having a pattern of openings around the surface thereof for permitting accumulated condensate to flow into the reflux line;
   a liquid level measuring device connected to said accumulator to measure the level of accumulated condensate in said accumulator and to generate a signal; and
   a control device in a heat input line to said distillation column operated in response to the generated signal to change the flow of heat to the distillation column.

2. Apparatus according to claim 1 wherein said heat input line is a steam line.

3. Apparatus according to claim 1 wherein the liquid level measuring device is a differential pressure transmitter.

4. Apparatus according to claim 1 wherein the liquid level measuring device is a nuclear gauge type.

5. Apparatus according to claim 1 wherein the openings around said standpipe are holes arranged in a spiral pattern.

6. Apparatus according to claim 1 wherein the openings around the standpipe are vee slots arranged in a spiral pattern.

* * * * *